United States Patent [19]

Walter

[11] 4,235,122
[45] Nov. 25, 1980

[54] BALL CIRCULATION TYPE OF SPIRAL GEARING

[75] Inventor: Wolfgang Walter, Schwabisch Gmund, Fed. Rep. of Germany

[73] Assignee: Zahnradfabrik Friedrichshafen AG, Friedrichshafen, Fed. Rep. of Germany

[21] Appl. No.: 15,954

[22] Filed: Feb. 28, 1979

[30] Foreign Application Priority Data

Mar. 6, 1978 [DE] Fed. Rep. of Germany ....... 2809647

[51] Int. Cl.³ .............................................. F16H 55/22
[52] U.S. Cl. .................................. 74/424.8 R; 74/459
[58] Field of Search ........ 74/216.3, 424.8 R, 424.8 A, 74/424.8 B, 424.8 NA, 459

[56] References Cited

U.S. PATENT DOCUMENTS

| | | | |
|---|---|---|---|
| 1,967,482 | 7/1934 | Schmidt | 74/459 |
| 2,945,392 | 7/1960 | Folkerts | 74/459 |
| 3,161,073 | 12/1964 | Deutsch et al. | 74/459 X |
| 3,306,124 | 2/1967 | Adams | 74/459 |
| 3,327,551 | 6/1967 | Prueter | 74/459 |
| 3,815,435 | 6/1974 | Eschenbacher et al. | 74/459 |

Primary Examiner—C. J. Husar
Attorney, Agent, or Firm—Zalkind & Shuster

[57] ABSTRACT

A ball circulation type of screw and nut spiral gearing having a ball return tube establishing a passage between the ball guiding channels of the gearing within an elongated peripheral slot formed in the nut. A spacer is disposed between the ball return tube and a cover wall surrounding the nut to maintain the spacer and ball return tube in proper assembled positions. The spacer and ball return tube are interengaged to form a preassembly unit for joint installation into the peripheral slot of nut during assembly of the gearing.

10 Claims, 4 Drawing Figures

BALL CIRCULATION TYPE OF SPIRAL GEARING

BACKGROUND OF THE INVENTION

This invention relates to spiral gearing of the ball circulation type used, for example, in steering systems for motor vehicles and for vehicle brake actuators.

Ball circulation types of spiral gearing always include a spiral or screw gear and a nut between which a plurality of spherical elements or balls are disposed in a spiral shaped groove.. Rotation of the spiral gear by a manual steering wheel through a steering spindle, e.g., thus results in an axial shift of the nut. The balls traveling through the spiral shaped groove or ball guiding channels of the gear are returned from one end of the guiding channels to the other by a ball return tube disposed within a peripheral slot in the nut. In order to maintain the proper position of the ball return tube for guiding safe return of the balls, a spacer is generally disposed between the ball return tube and a cover enclosing the peripheral slot in the nut. The cover wall surrounding the nut, such as the cylinder or steering housing of a motor vehicle steering system, holds the spacer and the ball return tube within the nut between the two ends of the ball guiding channels.

In assembling the ball circulation type spiral gearing, the ball return tube was heretofore intoduced into the peripheral slot of the nut and thereby plugged into the ball guiding channels at the two ends thereof. The spacer was then separately inserted above the ball return tube and the screw gear installed. This method of assembly has certain drawbacks. During assembly, one sometimes forgets to insert the spacer. Although the spiral gearing will initially function despite the absence of the spacer, during subsequent operartion the ends of the ball return tube slip out of the ball guiding channels without being detected. In such event, the balls escape from the ball guiding channels and the gearing eventually becomes inoperative. In a steering system, this leads to failure wihtout any prior indication.

It is therefore an important object of the present invention to provide spiral gearing of the ball circulation type which will prevent the aforementioned drawback or problem in the assembly of such gearing.

SUMMARY OF THE INVENTION

In accordance with the present invention, both the spacer and the ball return tube are so constructed that they are preassembled as one unit independently of the installation prior to insertion into the gearing assembly. As a result, assembly errors as aforementioned in connection with prior art spiral gearing arrangements are avoided as well as resulting malfunction or failure without prior indication of the defect. In view of the preassembly of the spacer and ball return tube, independently of its installation, perfect functioning of the steering system is assured indefinitely. Thus, the pressembled spacer and ball return tube are either installed correctly, or else the preassembled unit is completely omitted when assembling the grearing so that the steering system will not function at all from the very beginning, enabling one to detect the omission before the system is put into operation.

According to one embodiment of the invention, the spacer is provided with elastic flaps having projections which embrace the ball return tube in a manner similar to clips. This feature of the invention provides a simple and effective connection between the two parts of the preassembly unit. Preferably, the spacer is made of a resilient plastic material. However, it will be appreciated that other elastically resilient materials may be utilized within the scope of the invention.

According to another feature of the invention, the ball return tube is formed from two half sections held assembled by means of the spacer. This will simplify manufacturing and assembly of the ball return tube. The fitting reationship between the spacer and the peripheral slot in the nut provides addtional insurance against failure of the steering system as a result of improper assembly. The internal surface of the peripheral slot is so configured that the elastic flaps aforementioned cannot be flexed outwardly to nullify the connection established between the spacer and the ball return tube. The proper positioning of the ball return tube is thereby assured and any change in such position prevented.

A detailed description of the invention now follows in conjunction with the appended drawings.

BRIEF DESCRIPTION OF DRAWING FIGURES

DETAILED DESCRIPTION OF SPECIFIC EMBODIMENT

Figure 2:
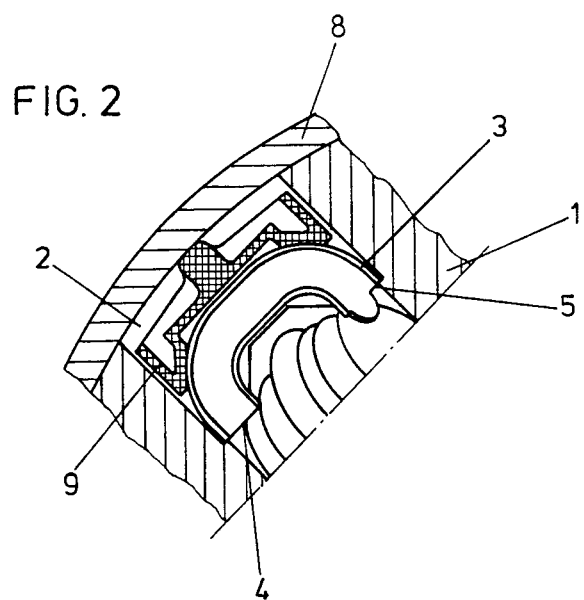
FIG. 2 is a section view taken substantially through a plane indicated by Section II in FIG. 1.
Figure 1:
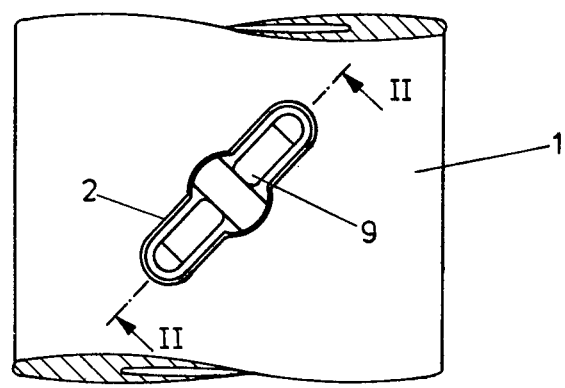
FIG. 1 is a top plan view of the nut of a ball circulation type spiral gearing with the cover removed.

FIG. 1 illustrates a nut 1 forming part of spiral gearing of the ball-circulation type generally well known in the art. The nut 1 as shown in FIG. 1 has its radially outer surface exposed so as to show a peripheral slot 2 formed therein. In order to accommodate the return passage of balls that are circulated during operation of the spiral gearing in a manner well known in the art, a ball return tube 3 is seated within the peripheral slot as shown in FIG. 2, having two ends 4 and 5 operatively positioned relative to the ball guiding grooves of a spiral gear. In the embodiment illustrated, the ball return tube 3 is formed by two half sections 6 and 7 as more clearly seen in FIG. 4.

With reference to FIG. 2, a spacer 9 is disposed between the ball return tube 3 and a cover wall 8 surrounding the nut 1. The ball return tube is thereby held securely within the peripheral slot 2 of the nut in operative relationship to the ball guiding channels of the spiral gear. The ball return tube 3 and the spacer 9 are preassembled and jointly inserted into the peripheral slot 2.

Figure 4:
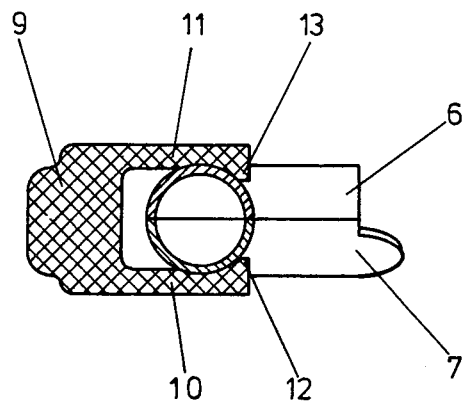
FIG. 4 is a section view taken substantially through a plane indicated by Section line IV—IV in FIG. 3.
Figure 3:
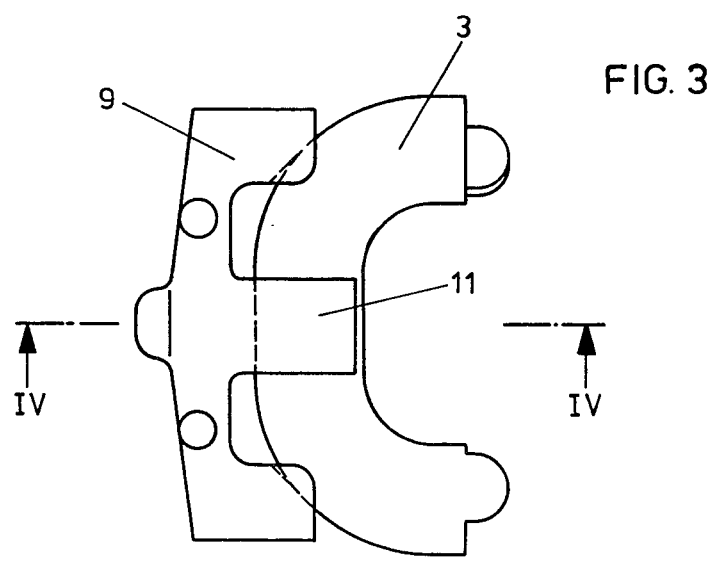
FIG. 3 is a side elevation of a preassembly unit formed by a spacer and ball return tube in accordance with the present invention.

FIGS. 3 and 4 more clearly illustrate the preassembly of the ball return tube 3 and spacer 9 independently of the grearing installation. The spacer 9, preferably made of a resilient plastic material, has two flexible flaps 10 and 11. The two flaps have at their free ends, projections 12 and 13, directed inwardly toward each other. Accordingly, the spacer 9 is pushed onto the ball return so that the tube is engaged by the flaps 10 and 11 embracing the tube half sections and holding them assembled. The spacing between the two flaps 10 and 11 and their end projections 12 and 13 is such that they may readily flex outwardly while being pushed over the tube to embrace the tube half sections in a manner similar to that of a clip. Thus, spacer 9 not only holds the tube 3 assembled, but also forms therewith a preassembly unit.

The peripheral slot 2 formed in the nut has an internal surface dimensioned relative to the spacer 9 so that the flaps 10 and 11 cannot flex outwardly after the preassembly unit is inserted. As a result, contact between the ball return tube 3 and the spacer is maintained so as to securely hold the ball return tube in operative position without any likelihood of a change in such position during operation of the grearing.

What is claimed is:

1. In a ball-circulation type of spiral gearing having a nut (1), a ball return tube (3) exclusively establishing a return passage between ball guiding channels of the gearing, within an elongated peripheral slot (2) in the nut, a spacer (9) in engagement with the ball return tube in spaced relation to the ball guiding channels and a cover (8) enclosing the spacer and the ball return tube within the unit, the improvement residing in means (10,11) for holding the spacer and the ball return tube preassembled as a unit independently of the spiral gearing and insertable into the nut through said slot, and means for preventing disassembly of said unit after insertion into the peripheral slot.

2. The combination of claim 1, wherein the ball return tube includes two half sectons held together by the spacer in the preassembled unit.

3. The combination of claim 1 wherein said nut has a outer surface through which the slot extends and on which the cover is supported, said ball return tube being radially spaced from the outer surface by the spacer.

4. In a ball-circulation type of spiral gearing having a nut (1) and a ball return tube (3) establishing a return passage, between ball guiding channels of the gearing, within an elongated peripheral slot (2) in the nut, and a spacer (9) located between the ball return tube and a cover (8) surrounding the nut, the improvement residing in means (10, 11) for holding the spacer and the ball return tube preassembled as a unit independently of the spiral gearing and means for preventing disassembly of said unit after insertion into the peripheral slot, said holding means including a pair of elastic flaps (10, 11) formed on the spacer having projections (12, 13) embracing the ball return tube.

5. The combination of claim 4, wherein the spacer is made of a plastic material.

6. The combination of claim 4, wherein the ball return tube includes two half sections (6, 7) held together by the spacer.

7. The combination of claim 6, wherein said disassembly preventing means comprises an internal surface of the peripheral slot dimensioned relative to the spacer to prevent outward flexing of the flaps.

8. The combination of claim 4, wherein said disassembly preventing means comprises an internal surface of the peripheral slot engageable with said flaps to prevent outward flexing thereof.

9. The combination of claim 8, wherein the spacer is made of a plastic material.

10. For use in a spiral gearing assembly having a nut (1) provided with a slot (2) extending radially therethrough, a return guide unit received in said slot of the nut for recirculating ball elements, comprising a pair of tube sections (6, 7) between which a ball return passage is formed and spacer means (9) for holding the tube sections assembled independently of the nut, means for locking the tube sections in assembled relation to the spacer means in response to insertion of the return guide unit into the slot, and separable cover means (8) mounted on the nut in engagement with the spacer means exposed through the slot for retaining the assembled return guide unit within the nut to operatively position the ball return passage therein.

* * * * *